United States Patent
Bergmann

[11] Patent Number: 5,482,080
[45] Date of Patent: Jan. 9, 1996

[54] CHECK VALVE

[75] Inventor: Konrad Bergmann, Wittlich, Germany

[73] Assignee: Ideal-Standard GmbH, Bonn, Germany

[21] Appl. No.: 178,248
[22] PCT Filed: Mar. 10, 1992
[86] PCT No.: PCT/EP92/00539
§ 371 Date: Feb. 15, 1994
§ 102(e) Date: Feb. 15, 1994
[87] PCT Pub. No.: WO93/01434
PCT Pub. Date: Jan. 21, 1993

[30] Foreign Application Priority Data

Jul. 5, 1991 [AT] Austria .................... 1354/91

[51] Int. Cl.[6] .................................... F16K 21/04
[52] U.S. Cl. ........................ 137/549; 137/543.13
[58] Field of Search ....................... 137/544, 549, 137/543.13

[56] References Cited

U.S. PATENT DOCUMENTS

| 1,473,667 | 11/1923 | Burks | 137/544 |
| 1,800,066 | 4/1931 | Glass | 137/549 |
| 1,828,697 | 10/1931 | Yardley | 137/543.13 |
| 2,335,899 | 12/1943 | Arvintz | 137/544 |
| 4,365,648 | 12/1982 | Grothe | 137/544 |

Primary Examiner—A. Michael Chambers
Attorney, Agent, or Firm—Herbert Dubno

[57] ABSTRACT

A check valve with a housing having a valve seat, a valve closing member cooperating with the valve seat and an upstream dirt trapping filter, particularly for sanitary water fittings, wherein the dirt trapping filter and housing are of a unitary construction.

3 Claims, 1 Drawing Sheet

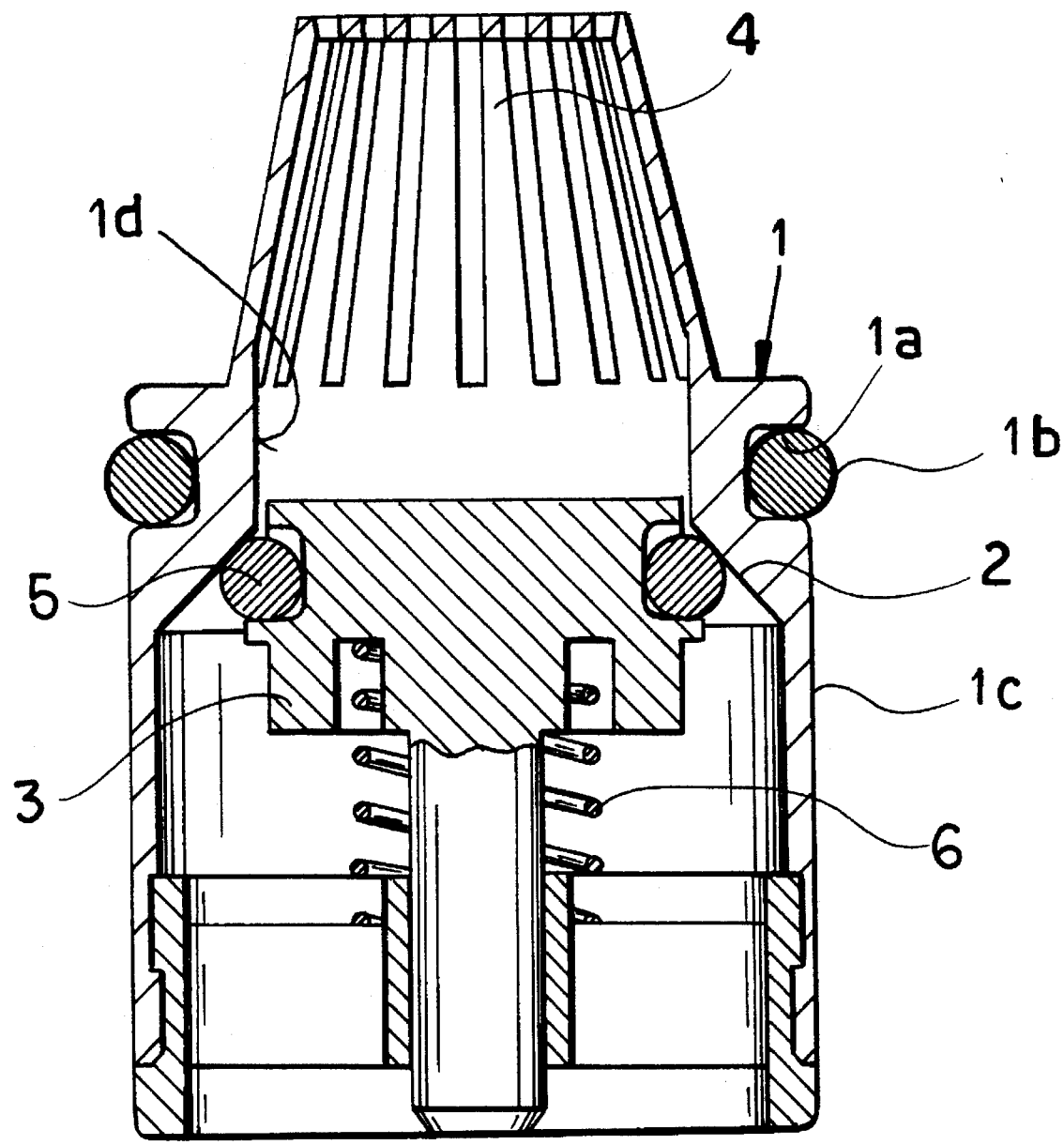

CHECK VALVE

CROSS REFERENCE TO RELATED APPLICATIONS

This application is a national phase of PCT/EP92/00539 filed 10 Mar. 1992 and based, in turn, upon Austrian national application A 1354/91 filed 5 Jul. 1991.

The invention relates to a check valve with a housing having a valve seat, a valve closing member cooperating with the valve seat and an upstream dirt trapping filter, particularly for sanitary water fittings.

BACKGROUND OF THE INVENTION

There is a general need for devices preventing return flow, for instance under conditions of underpressure, in order to prevent the penetration of air into a supply line, or the return to the supply duct of a liquid which had already passed through. With regard to water supply applications, there is a large interest in preventing a return flow of water into the supply lines, since the water might then lose its drinking quality.

In order to prevent such return flows it is known to use check valves whose movable valve closing members are subjected to spring action in the direction of a valve seat which is provided in the housing of the check valve.

In order to protect the valve control elements against the incursion of for instance Teflon-hemp (packing) residues, chips or similar dirt particles, which could affect the operational safety of the valve, it has been long known to arrange dirt trapping filters in water fittings, upstream of the valve control elements, these filters being separate components to be manufactured and mounted separately, which is not only expensive from the point of view of manufacturing and assembly, but furthermore presents the danger, for instance when the dirt trapping filter has to be mounted again, especially during repairs, that it will be left out altogether, thereby after a certain time, leading to the failure of the check valve.

OBJECT OF THE INVENTION

It is the object of the invention to eliminate this drawback and to provide a check valve of the aforementioned kind, which can be manufactured at relatively low cost, can be easily mounted and especially maintain operational safety, even after being in operation for a long time.

SUMMARY OF THE INVENTION

This object is achieved by rigidly connecting the dirt trapping filter with the housing.

Preferably the dirt trapping filter is made in one piece with the housing.

Further it is advantageous when the dirt trapping filter has a conical configuration and a largest diameter which is smaller than the outer diameter of the housing.

BRIEF DESCRIPTION OF THE DRAWING

In the drawing the check valve of the invention is illustrated in an embodiment example, namely the figure shows a longitudinal section.

SPECIFIC DESCRIPTION

The check valve according to the invention, can be arranged in the supply duct of a sanitary mixing faucet, e.g. within the connection point between the "S"-connections and a flow control valve.

As can be seen from the drawing, the housing 1 is made in one piece with the conically shaped dirt trapping filter 4. At the same time the housing forms also the valve seat 2, against which the valve closing member 3 is pressed under the action of spring 6 with the assistance of seal 5.

As is also apparent from the drawing, the housing 1 has a groove 1a receiving another ring 1b and is of the same outer diameter as a cylindrical portion 1c of the housing extending away from the seat 2. The latter has an inner diameter which is the same as the diameter of a passage 1c between the filter 4 and the small diameter portion of the bevel forming the seat 2. The outer diameter of the filter 4, however, is less than the outer diameter of the housing 2.

I claim:

1. A check valve comprising:

a cylindrical housing having an outer diameter;

means forming a beveled valve seat in said housing, said valve seat having an inner diameter;

a frustoconical dirt-trapping filter formed in one piece with said housing, upstream of said seat and having a large end facing said housing and of an outer diameter less than said outer diameter of said housing and an inner diameter equal to said inner diameter of said valve seat, said housing having a passage of a diameter equal to said inner diameter between said large end of said filter and said valve seat, said housing further having a cylindrical portion of said outer diameter of said housing extending away from said seat opposite said passage; and a valve closing member in said housing cooperating with said seat.

2. The check valve defined in claim 1, further comprising a spring in said housing, braced against said housing and bearing upon said member.

3. The check valve defined in claim 2 wherein said filter is formed with elongated slits lying along generatrices of a frustocone forming said filter, said member being provided with a sealing ring engageable with said seat, and said housing has a peripheral groove receiving a further ring.

* * * * *